(12) United States Patent
Lin et al.

(10) Patent No.: US 9,917,504 B2
(45) Date of Patent: Mar. 13, 2018

(54) SYNCHRONOUS RECTIFIER APPLIED TO A POWER CONVERTER AND OPERATION METHOD THEREOF

(71) Applicant: Leadtrend Technology Corp., Hsinchu County (TW)

(72) Inventors: Chung-Wei Lin, Hsinchu County (TW); Yang-Sheng Lin, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 15/180,104

(22) Filed: Jun. 13, 2016

(65) Prior Publication Data

US 2017/0070151 A1 Mar. 9, 2017

(30) Foreign Application Priority Data

Sep. 9, 2015 (TW) .............................. 104129731 A

(51) Int. Cl.
| | |
|---|---|
| *H02M 3/335* | (2006.01) |
| *H02M 1/36* | (2007.01) |
| *H02M 1/08* | (2006.01) |
| H02M 1/38 | (2007.01) |
| H02M 7/217 | (2006.01) |

(52) U.S. Cl.
CPC .............. *H02M 1/36* (2013.01); *H02M 1/08* (2013.01); *H02M 3/33576* (2013.01); *H02M 1/38* (2013.01); *H02M 7/217* (2013.01)

(58) Field of Classification Search
CPC ............ H02M 3/335; H02M 3/33546; H02M 3/33569; H02M 3/33576; H02M 3/33592
See application file for complete search history.

(56) References Cited

U.S. PATENT DOCUMENTS 6,760,235 B2 * 7/2004 Lin ......................... H02M 1/36
363/21.06

FOREIGN PATENT DOCUMENTS

TW 201203828 A1 1/2012

* cited by examiner

*Primary Examiner* — Gary L Laxton
(74) *Attorney, Agent, or Firm* — Winston Hsu

(57) ABSTRACT

A synchronous rectifier applied to a power converter includes a gate coupling effect suppressing unit. The gate coupling effect suppressing unit is used for suppressing an induced voltage coupled to a gate of a metal-oxide-semiconductor transistor coupled to a secondary side of the power converter to ensure that the metal-oxide-semiconductor transistor is turned off when the power converter operates in a start-up condition and a power switch of the power converter is turned on. When the power converter operates in the start-up condition, a driving voltage of the secondary side of the power converter for driving the synchronous rectifier is not enough to drive the synchronous rectifier yet.

13 Claims, 4 Drawing Sheets

SYNCHRONOUS RECTIFIER APPLIED TO A POWER CONVERTER AND OPERATION METHOD THEREOF

BACKGROUND OF THE INVENTION

1. Field of the Invention

The present invention relates to a synchronous rectifier applied to a power converter and an operation method thereof, and particularly to a synchronous rectifier and an operation method thereof that can ensure that a primary side and a secondary side of a power converter are not simultaneously turned on when the power converter starts up.

2. Description of the Prior Art

When an alternating current (AC)/direct current (DC) power converter starts up and a power switch of a primary side of the AC/DC power converter is turned on, a secondary winding of a secondary side of the AC/DC power converter generates an induced voltage according to a current flowing through the primary side of the AC/DC power converter. Meanwhile, because when the AC/DC power converter operates in a start-up condition and the power switch is turned on, a driving voltage of the secondary side of the AC/DC power converter for driving a synchronous rectifier applied to the AC/DC power converter is not enough to drive the synchronous rectifier, the synchronous rectifier cannot generate a gate control signal to turn off a metal-oxide-semiconductor transistor coupled to the secondary side of the AC/DC power converter. That is to say, meanwhile, a gate of the metal-oxide-semiconductor transistor is floating. Therefore, if the induced voltage coupled to the gate of the metal-oxide-semiconductor transistor through a parasitic capacitor between a drain and the gate of the metal-oxide-semiconductor transistor is not suppressed, the metal-oxide-semiconductor transistor may be turned on, resulting in the primary side of the AC/DC power converter and the secondary side of the AC/DC power converter being simultaneously turned on. Therefore, how to ensure that the metal-oxide-semiconductor transistor is turned off when the AC/DC power converter operates in the start-up condition and the power switch is turned on has become an important issue of a designer of the synchronous rectifier.

SUMMARY OF THE INVENTION

An embodiment of the present invention provides a synchronous rectifier applied to a power converter. The synchronous rectifier includes a gate coupling effect suppressing unit. The gate coupling effect suppressing unit is used for suppressing an induced voltage coupled to a gate of a metal-oxide-semiconductor transistor coupled to a secondary side of the power converter to ensure that the metal-oxide-semiconductor transistor is turned off when the power converter operates in a start-up condition and a power switch of a primary side of the power converter is turned on, wherein when the power converter operates in the start-up condition, a driving voltage of the secondary side of the power converter for driving the synchronous rectifier is not enough to drive the synchronous rectifier.

Another embodiment of the present invention provides an operation method of a synchronous rectifier applied to a power converter, wherein the synchronous rectifier includes a gate coupling effect suppressing unit. The operation method includes starting up the power converter and turning on a power switch of a primary side of the power converter; a secondary winding of a secondary side of the power converter generating an induced voltage according to a current flowing through the primary side of the power converter; the gate coupling effect suppressing unit suppressing the induced voltage coupled to a gate of a metal-oxide-semiconductor transistor coupled to the secondary side of the power converter to ensure that the metal-oxide-semiconductor transistor is turned off, wherein when the power converter operates in a start-up condition, a driving voltage of the secondary side of the power converter for driving the synchronous rectifier is not enough to drive the synchronous rectifier.

The present invention provides a synchronous rectifier applied to a power converter and an operation method thereof. The synchronous rectifier and the operation method suppress an induced voltage coupled to a gate of a metal-oxide-semiconductor transistor coupled to a secondary side of the power converter to ensure that the metal-oxide-semiconductor transistor is turned off when the power converter operates in a start-up condition and a power switch of a primary side of the power converter is turned on. Thus, because when the power converter operates in the start-up condition and the power switch is turned on, the present invention can ensure that the metal-oxide-semiconductor transistor is turned off, the present invention not only can prevent the primary side and the secondary side of the power converter from being simultaneously turned on, but can also prevent the power converter from failing to start up or malfunctioning.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
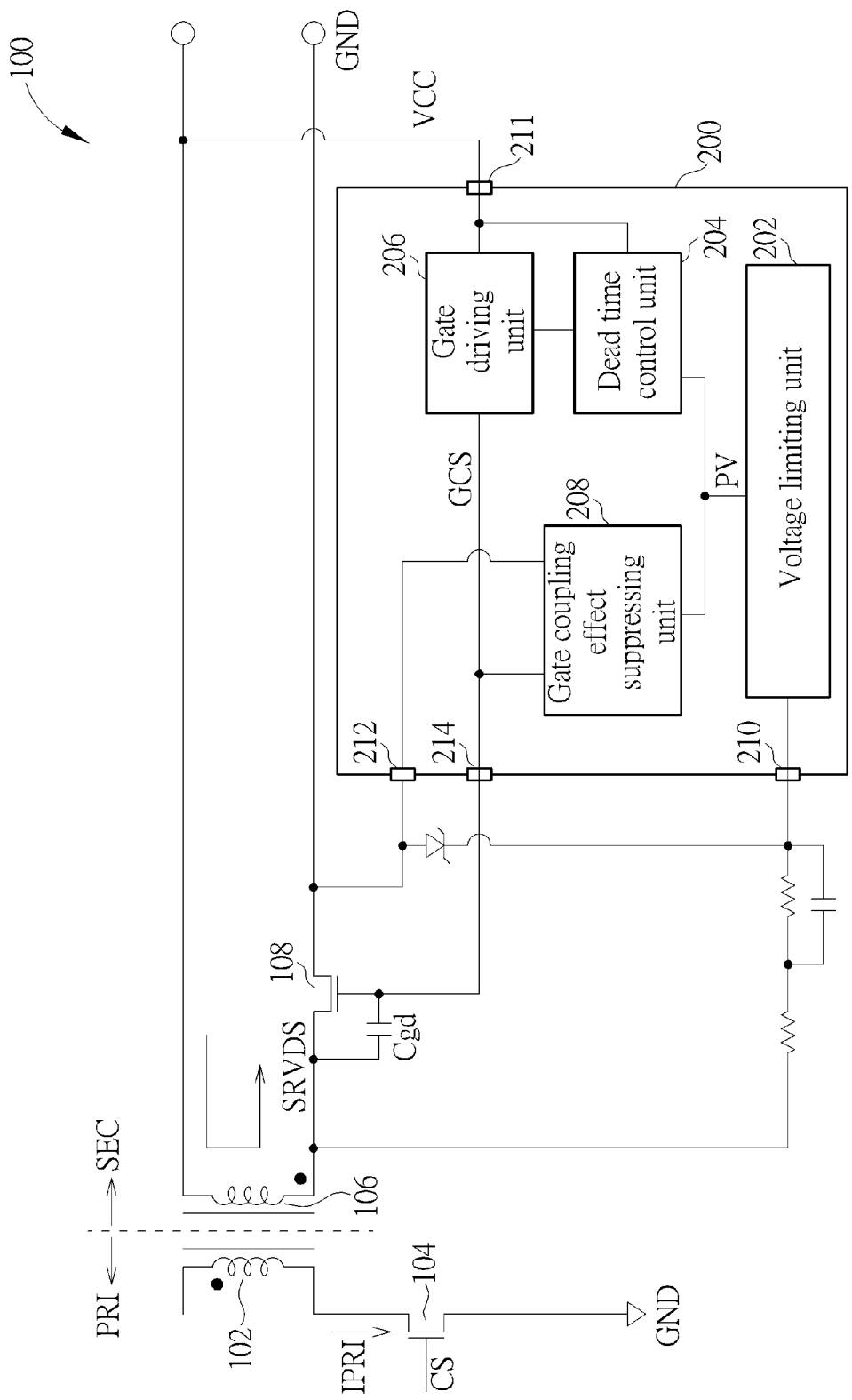
FIG. 1 is a diagram illustrating a synchronous rectifier applied to a power converter according to a first embodiment of the present invention.

Please refer to FIG. 1. FIG. 1 is a diagram illustrating a synchronous rectifier 200 applied to a power converter 100 according to a first embodiment of the present invention, wherein a primary side PRI of the power converter 100 only shows a primary winding 102 and a power switch 104 in FIG. 1, and the power converter 100 is an alternating current (AC)/direct current (DC) power converter. As shown in FIG. 1, the synchronous rectifier 200 includes a voltage limiting unit 202, a dead time control unit 204, a gate driving unit 206, and a gate coupling effect suppressing unit 208. As shown in FIG. 1, when the power converter 100 starts up and the power switch 104 is turned on, a secondary winding 106 of a secondary side SEC of the power converter 100 can generate an induced voltage SRVDS (corresponding to a control signal CS of the power switch 104) according to a current IPRI flowing through the primary side PRI of the power converter 100. As shown in FIG. 1, the voltage limiting unit 202 can receive the induced voltage SRVDS through a pin 210 of the synchronous rectifier 200, and limit the induced voltage SRVDS to a predetermined voltage PV, wherein the predetermined voltage PV is less than the induced voltage SRVDS, and the voltage limiting unit 202 is a clamp circuit. But, the present invention is not limited to the voltage limiting unit 202 being a clamp circuit. In another embodiment of the present invention, if the induced voltage SRVDS is lower, because the lower induced voltage SRVDS does not damage the dead time control unit 204 and the gate coupling effect suppressing unit 208, the synchronous rectifier 200 does not need the voltage limiting unit 202. As shown in FIG. 1, because when the power converter 100 operates in a start-up condition and the power switch 104 is turned on, the driving voltage VCC of the secondary side SEC of the power converter 100 for driving the synchronous rectifier 200 is not enough to drive the dead time control unit 204 and the gate driving unit 206, the gate driving unit 206 cannot generate a gate control signal GCS to turn off a metal-oxide-semiconductor transistor 108 coupled to the secondary side SEC of the power converter 100, wherein the driving voltage VCC is transmitted to the dead time control unit 204 and the gate driving unit 206 through a pin 211 of the synchronous rectifier 200, and the gate control signal GCS is transmitted to the metal-oxide-semiconductor transistor 108 through a pin 214 of the synchronous rectifier 200. That is to say, meanwhile, a gate of the metal-oxide-semiconductor transistor 108 is floating. Therefore, if the induced voltage SRVDS coupled to the gate of the metal-oxide-semiconductor transistor 108 through a parasitic capacitor Cgd cannot be suppressed, the metal-oxide-semiconductor transistor 108 may be turned on, resulting in the primary side PRI of the power converter 100 and the secondary side SEC of the power converter 100 simultaneously being turned on (because the power converter 100 is a flyback power converter, the primary side PRI of the power converter 100 and the secondary side SEC of the power converter 100 cannot be simultaneously turned on). Therefore, the gate coupling effect suppressing unit 208 of the synchronous rectifier 200 is used for utilizing the predetermined voltage PV (corresponding to the induced voltage SRVDS coupled to the gate of the metal-oxide-semiconductor transistor 108 through the parasitic capacitor Cgd) to suppress the induced voltage SRVDS coupled to the gate of the metal-oxide-semiconductor transistor 108 through the parasitic capacitor Cgd to ensure that the metal-oxide-semiconductor transistor 108 is turned off when the power converter 100 operates in the start-up condition and the power switch 104 is turned on (meanwhile, the dead time control unit 204 and the gate driving unit 206 are not driven by the driving voltage VCC yet). That is to say, before the dead time control unit 204 and the gate driving unit 206 are driven by the driving voltage VCC, when the power switch 104 is turned on (that is, the primary side PRI of the power converter 100 is turned on), the gate coupling effect suppressing unit 208 can utilize the predetermined voltage PV to pull potential of the gate of the metal-oxide-semiconductor transistor 108 to ground GND through a pin 212 of the synchronous rectifier 200 to ensure that the metal-oxide-semiconductor transistor 108 is turned off (that is, the secondary side SEC of the power converter 100 is turned off).

Figure 2:
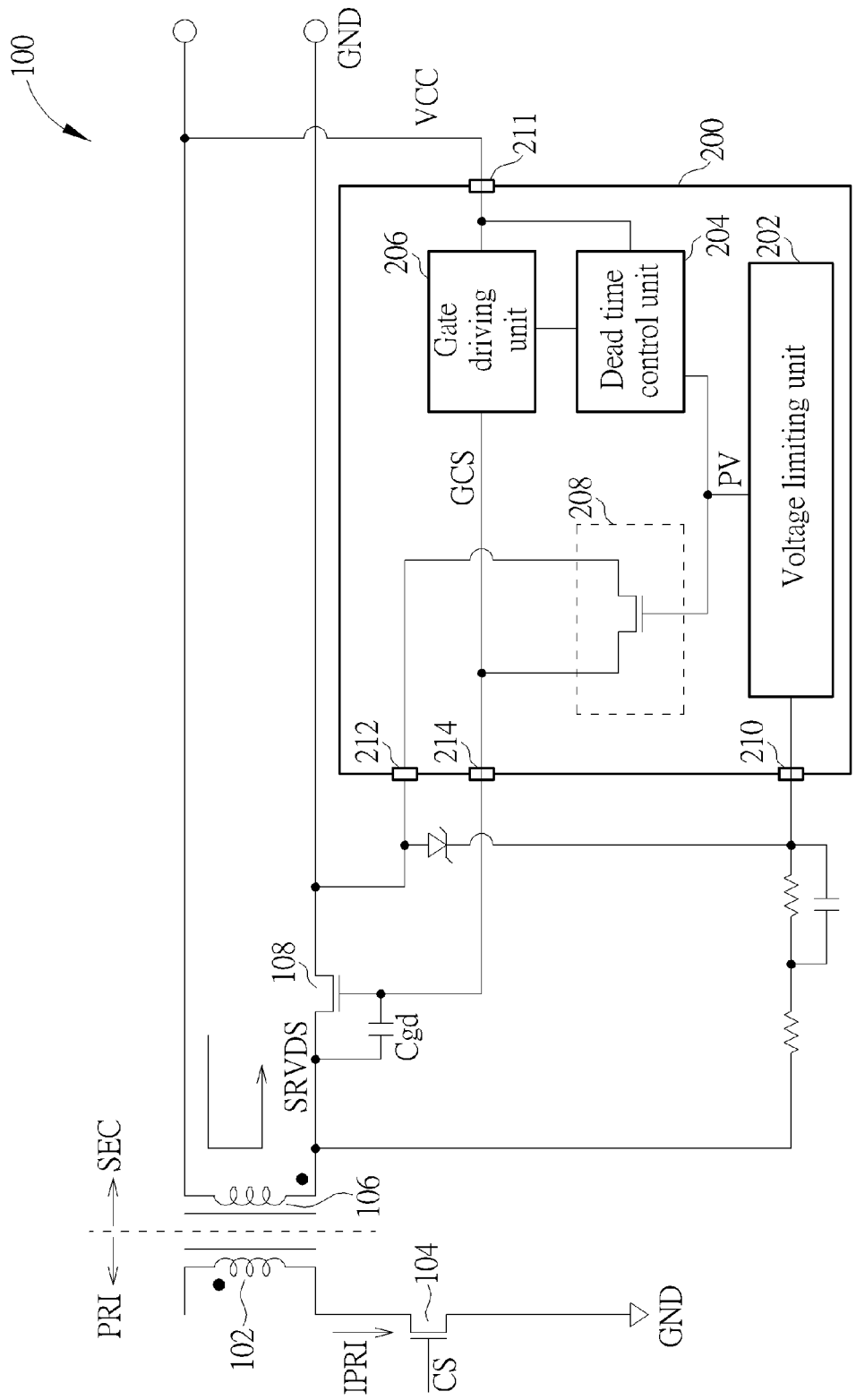
FIG. 2 is a diagram illustrating the gate coupling effect suppressing unit being an N-type metal-oxide-semiconductor transistor.

Please refer to FIG. 2. FIG. 2 is a diagram illustrating the gate coupling effect suppressing unit 208 being an N-type metal-oxide-semiconductor transistor. As shown in FIG. 2, before the dead time control unit 204 and the gate driving unit 206 are driven by the driving voltage VCC, when the power switch 104 is turned on (that is, the primary side PRI of the power converter 100 is turned on), the predetermined voltage PV (corresponding to the induced voltage SRVDS coupled to the gate of the metal-oxide-semiconductor transistor 108 through the parasitic capacitor Cgd) can be utilized to turn on the N-type metal-oxide-semiconductor transistor. Because the predetermined voltage PV can be utilized to turn on the N-type metal-oxide-semiconductor transistor, conduction of the N-type metal-oxide-semiconductor transistor can pull the potential of the gate of the metal-oxide-semiconductor transistor 108 to the ground GND to ensure that the metal-oxide-semiconductor transistor 108 is turned off. In addition, the present invention is not limited to the gate coupling effect suppressing unit 208 being an N-type metal-oxide-semiconductor transistor. That is to say, the gate coupling effect suppressing unit 208 can also be a bipolar junction transistor (BJT), a circuit not driven by the driving voltage VCC, a circuit driven by the induced voltage SRVDS, or a circuit driven by the predetermined voltage PV. In addition, in another embodiment of the present invention, when the induced voltage SRVDS is lower (meanwhile, the synchronous rectifier 200 does not need the voltage limiting unit 202), the gate coupling effect suppressing unit 208 can utilize the induced voltage SRVDS to pull the potential of the gate of the metal-oxide-semiconductor transistor 108 to the ground GND to ensure that the metal-oxide-semiconductor transistor 108 is turned off.

Figure 3:
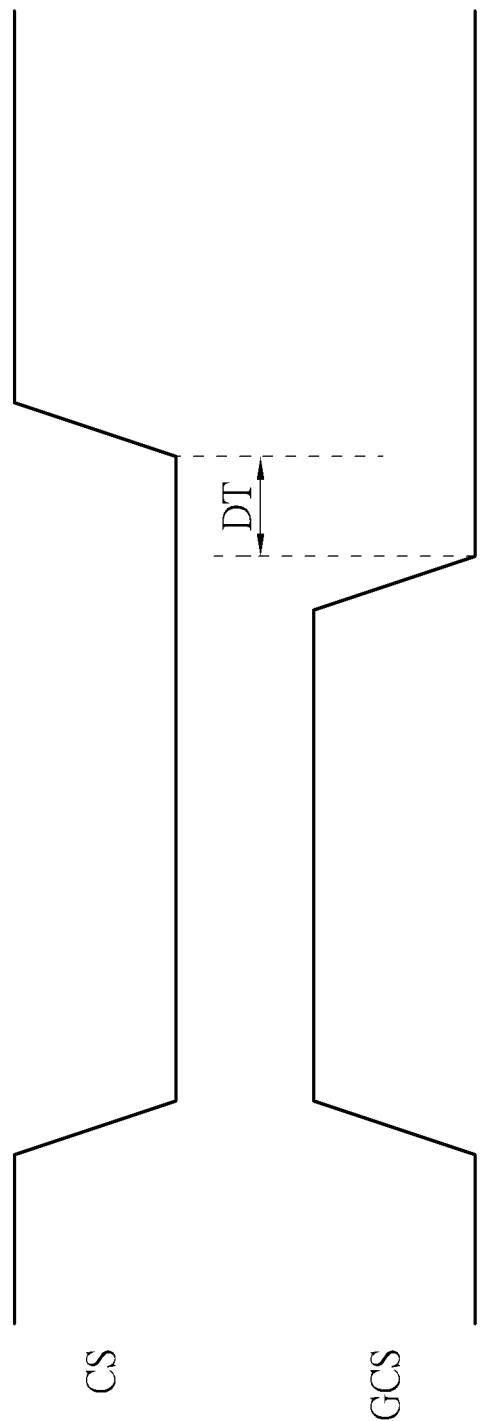
FIG. 3 is a diagram illustrating the gate control signal and the control signal.

Please refer to FIG. 3. FIG. 3 is a diagram illustrating the gate control signal GCS and the control signal CS. As shown in FIG. 3, the dead time control unit 204 is used for determining a dead time DT according to the predetermined voltage PV (corresponding to the control signal CS of the power switch 104); and the gate driving unit 206 is used for generating the gate control signal GCS controlling turning-on and turning-off of the metal-oxide-semiconductor transistor 108 according to the dead time DT, wherein the gate control signal GCS is transmitted to the metal-oxide-semiconductor transistor 108 through the pin 214 of the synchronous rectifier 200. As shown in FIG. 3, the gate control signal GCS and the control signal CS are not overlapped each other to prevent the primary side PRI of the power converter 100 and the secondary side SEC of the power converter 100 from being simultaneously turned on. In addition, in another embodiment of the present invention, when the induced voltage SRVDS is lower (meanwhile, the synchronous rectifier 200 does not need the voltage limiting unit 202), the dead time control unit 204 determines the dead time DT according to the induced voltage SRVDS.

Figure 4:
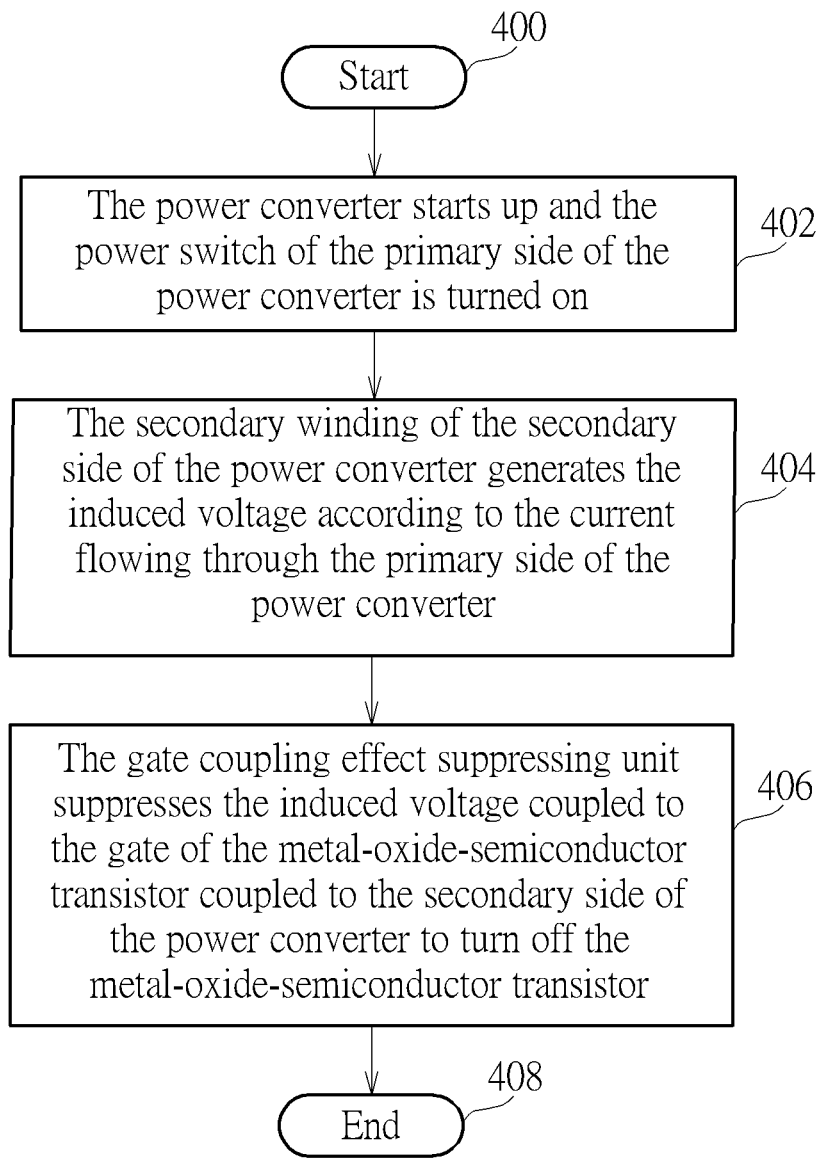
FIG. 4 is a flowchart illustrating an operation method of a synchronous rectifier applied to a power converter according to a second embodiment of the present invention.

Please refer to FIG. 1 and FIG. 4. FIG. 4 is a flowchart illustrating an operation method of a synchronous rectifier applied to a power converter according to a second embodiment of the present invention. The operation method in FIG. 4 is illustrated using the power converter 100 and the synchronous rectifier 200 in FIG. 1. Detailed steps are as follows:

Step 400: Start.

Step 402: The power converter 100 starts up and the power switch 104 of the primary side PRI of the power converter 100 is turned on.

Step 404: The secondary winding 106 of the secondary side SEC of the power converter 100 generates the induced voltage SRVDS according to the current IPRI flowing through the primary side PRI of the power converter 100.

Step 406: The gate coupling effect suppressing unit 208 suppresses the induced voltage SRVDS coupled to the gate of the metal-oxide-semiconductor transistor 108 coupled to the secondary side SEC of the power converter 100 to turn off the metal-oxide-semiconductor transistor 108.

Step 408: End.

In Step 402 and Step 404, as shown in FIG. 1, when the power converter 100 operates in the start-up condition and the power switch 104 is turned on, the secondary winding 106 of the secondary side SEC of the power converter 100 can generate the induced voltage SRVDS (corresponding to the control signal CS of the power switch 104) according to the current IPRI flowing through the primary side PRI of the power converter 100. As shown in FIG. 1, the voltage limiting unit 202 can receive the induced voltage SRVDS through the pin 210 of the synchronous rectifier 200, and limit the induced voltage SRVDS to the predetermined voltage PV. But, in another embodiment of the present invention, if the induced voltage SRVDS is lower, because the lower induced voltage SRVDS does not damage the dead time control unit 204 and the gate coupling effect suppressing unit 208, the synchronous rectifier 200 does not need the voltage limiting unit 202. In Step 406, as shown in FIG. 1, because when the power converter 100 operates in the start-up condition and the power switch 104 is turned on, the driving voltage VCC of the secondary side SEC of the power converter 100 for driving the synchronous rectifier 200 is not enough to drive the dead time control unit 204 and the gate driving unit 206, the gate driving unit 206 cannot generate the gate control signal GCS to turn off the metal-oxide-semiconductor transistor 108 coupled to the secondary side SEC of the power converter 100. That is to say, meanwhile, the gate of the metal-oxide-semiconductor transistor 108 is floating. Therefore, the gate coupling effect suppressing unit 208 of the synchronous rectifier 200 can utilize the predetermined voltage PV (corresponding to the induced voltage SRVDS coupled to the gate of the metal-oxide-semiconductor transistor 108 through the parasitic capacitor Cgd) to suppress the induced voltage SRVDS coupled to the gate of the metal-oxide-semiconductor transistor 108 through the parasitic capacitor Cgd to ensure that the metal-oxide-semiconductor transistor 108 is turned off when the power converter 100 operates in the start-up condition and the power switch 104 is turned on (meanwhile, the dead time control unit 204 and the gate driving unit 206 are not driven by the driving voltage VCC yet). That is to say, before the dead time control unit 204 and the gate driving unit 206 are driven by the driving voltage VCC, when the power switch 104 is turned on (that is, the primary side PRI of the power converter 100 is turned on), the gate coupling effect suppressing unit 208 can utilize the predetermined voltage PV to pull the potential of the gate of the metal-oxide-semiconductor transistor 108 to the ground GND to ensure that the metal-oxide-semiconductor transistor 108 is turned off (that is, the secondary side SEC of the power converter 100 is turned off).

In addition, in another embodiment of the present invention, when the induced voltage SRVDS is lower (meanwhile, the synchronous rectifier 200 does not need the voltage limiting unit 202), the gate coupling effect suppressing unit 208 can utilize the induced voltage SRVDS to pull the potential of the gate of the metal-oxide-semiconductor transistor 108 to the ground GND to ensure that the metal-oxide-semiconductor transistor 108 is turned off.

To sum up, the synchronous rectifier applied to the power converter and the operation method thereof suppress the induced voltage coupled to the gate of the metal-oxide-semiconductor transistor coupled to the secondary side of the power converter to ensure that the metal-oxide-semiconductor transistor is turned off when the power converter operates in the start-up condition and the power switch is turned on. Thus, because when the power converter operates in the start-up condition and the power switch is turned on, the present invention can ensure that the metal-oxide-semiconductor transistor is turned off, the present invention not only can prevent the primary side and the secondary side of the power converter from being simultaneously turned on, but can also prevent the power converter from failing to start up or malfunctioning.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A synchronous rectifier applied to a power converter, comprising:
   a gate coupling effect suppressing unit for suppressing an induced voltage coupled to a gate of a metal-oxide-semiconductor transistor coupled to a secondary side of the power converter to ensure that the metal-oxide-semiconductor transistor is turned off when the power converter operates in a start-up condition and a power switch of a primary side of the power converter is turned on, wherein when the power converter operates in the start-up condition, a driving voltage of the secondary side of the power converter for driving the synchronous rectifier is not enough to drive the synchronous rectifier;
   a dead time control unit for determining a dead time according to a predetermined voltage; and
   a gate driving unit for generating a gate control signal controlling turning-on and turning-off of the metal-oxide-semiconductor transistor according to the dead time.

2. The synchronous rectifier of claim 1, further comprising:
   a voltage limiting unit for limiting the induced voltage to the predetermined voltage.

3. The synchronous rectifier of claim 2, wherein the voltage limiting unit is a clamp circuit.

4. The synchronous rectifier of claim 1, wherein the driving voltage being not enough to drive the synchronous rectifier is the driving voltage being not enough to drive the dead time control unit and the gate driving unit.

5. The synchronous rectifier of claim 1, wherein the gate coupling effect suppressing unit is an N-type metal-oxide-semiconductor transistor, a bipolar junction transistor (BJT), a circuit not driven by the driving voltage, or a circuit driven by the induced voltage.

6. The synchronous rectifier of claim 1, wherein the gate coupling effect suppressing unit suppressing the induced voltage coupled to the gate of the metal-oxide-semiconductor transistor to ensure that the metal-oxide-semiconductor transistor is turned off is the gate coupling effect suppressing unit pulling potential of the gate of the metal-oxide-semiconductor transistor to ground to ensure that the metal-oxide-semiconductor transistor is turned off.

7. A synchronous rectifier applied to a power converter, comprising:
   a gate coupling effect suppressing unit for suppressing an induced voltage coupled to a gate of a metal-oxide-semiconductor transistor coupled to a secondary side of the power converter to ensure that the metal-oxide-semiconductor transistor is turned off when the power converter operates in a start-up condition and a power switch of a primary side of the power converter is turned on, wherein when the power converter operates in the start-up condition, a driving voltage of the secondary side of the power converter for driving the synchronous rectifier is not enough to drive the synchronous rectifier;

a dead time control unit for determining a dead time according to the induced voltage; and a gate driving unit for generating a gate control signal controlling turning-on and turning-off of the metal-oxide-semiconductor transistor according to the dead time.

8. The synchronous rectifier of claim 7, wherein the driving voltage being not enough to drive the synchronous rectifier is the driving voltage being not enough to drive the dead time control unit and the gate driving unit.

9. The synchronous rectifier of claim 7, wherein the gate coupling effect suppressing unit is an N-type metal-oxide-semiconductor transistor, a bipolar junction transistor (BJT), a circuit not driven by the driving voltage, or a circuit driven by the induced voltage.

10. The synchronous rectifier of claim 7, wherein the gate coupling effect suppressing unit suppressing the induced voltage coupled to the gate of the metal-oxide-semiconductor transistor to ensure that the metal-oxide-semiconductor transistor is turned off is the gate coupling effect suppressing unit pulling potential of the gate of the metal-oxide-semiconductor transistor to ground to ensure that the metal-oxide-semiconductor transistor is turned off.

11. An operation method of a synchronous rectifier applied to a power converter, wherein the synchronous rectifier comprises a gate coupling effect suppressing unit, a dead time control unit, and a gate driving unit, the operation method comprising:

starting up the power converter and turning on a power switch of a primary side of the power converter;

a secondary winding of a secondary side of the power converter generating an induced voltage according to a current flowing through the primary side of the power converter;

the gate coupling effect suppressing unit suppressing the induced voltage coupled to a gate of a metal-oxide-semiconductor transistor coupled to the secondary side of the power converter to ensure that the metal-oxide-semiconductor transistor is turned off, wherein when the power converter operates in a start-up condition, a driving voltage of the secondary side of the power converter for driving the synchronous rectifier is not enough to drive the synchronous rectifier;

the dead time control unit determining a dead time according to a predetermined voltage or the induced voltage; and the gate driving unit generating a gate control signal controlling turning-on and turning-off of the metal-oxide-semiconductor transistor according to the dead time.

12. The operation method of claim 11, further comprising:

a voltage limiting unit limiting the induced voltage to the predetermined voltage.

13. The operation method of claim 11, wherein the gate coupling effect suppressing unit suppressing the induced voltage coupled to the gate of the metal-oxide-semiconductor transistor to ensure that the metal-oxide-semiconductor transistor is turned off is the gate coupling effect suppressing unit pulling potential of the gate of the metal-oxide-semiconductor transistor to ground to ensure that the metal-oxide-semiconductor transistor is turned off.

* * * * *